United States Patent [19]

Hasegawa et al.

[11] Patent Number: 5,268,762
[45] Date of Patent: Dec. 7, 1993

[54] VIDEO SIGNAL SYNTHESIZING SYSTEM FOR SYNTHESIZING SYSTEM'S OWN SIGNAL AND EXTERNAL SIGNAL

[75] Inventors: Makoto Hasegawa; Yasuhiro Kunimoto; Naomasa Nishimura, all of Kawasaki, Japan

[73] Assignee: Fujitsu Limited, Kawasaki, Japan

[21] Appl. No.: 839,101

[22] Filed: Feb. 19, 1992

[30] Foreign Application Priority Data

Feb. 20, 1991 [JP] Japan .................. 3-047631
Mar. 14, 1991 [JP] Japan .................. 3-074642

[51] Int. Cl.⁵ .......................................... H04N 5/262
[52] U.S. Cl. ........................................ 358/183; 345/200
[58] Field of Search ............. 358/183, 160, 140, 22, 358/181, 185, 182; 340/721

[56] References Cited

U.S. PATENT DOCUMENTS 5,027,212  6/1991  Marlton et al. .................. 358/183
5,099,331  3/1992  Truong ............................ 358/183

Primary Examiner—Victor R. Kostak

[57] ABSTRACT

In a video signal synthesizing system for synthesizing at least one inner video signal such as an analog video signal, digital image data, and encoded, compressed image data and so on from a system's own apparatus and an external analog video signal such as a character signal from an external apparatus; the inner video signal is converted into a digital video signal and the synchronous signal thereof is detected; the inner digital video signal is synthesized in digital form if a plurality of the inner video signal exists and stored in a memory; the level of the external analog video signal and the synchronous signal thereof are adjusted to be equal to the level of the inner video signal and the synchronous signal thereof, and then the adjusted external video signal and the inner video signal transmitted from the memory and converted to the analog signal are synthesized by the analog video signals adding means to be displayed by the display.

8 Claims, 8 Drawing Sheets

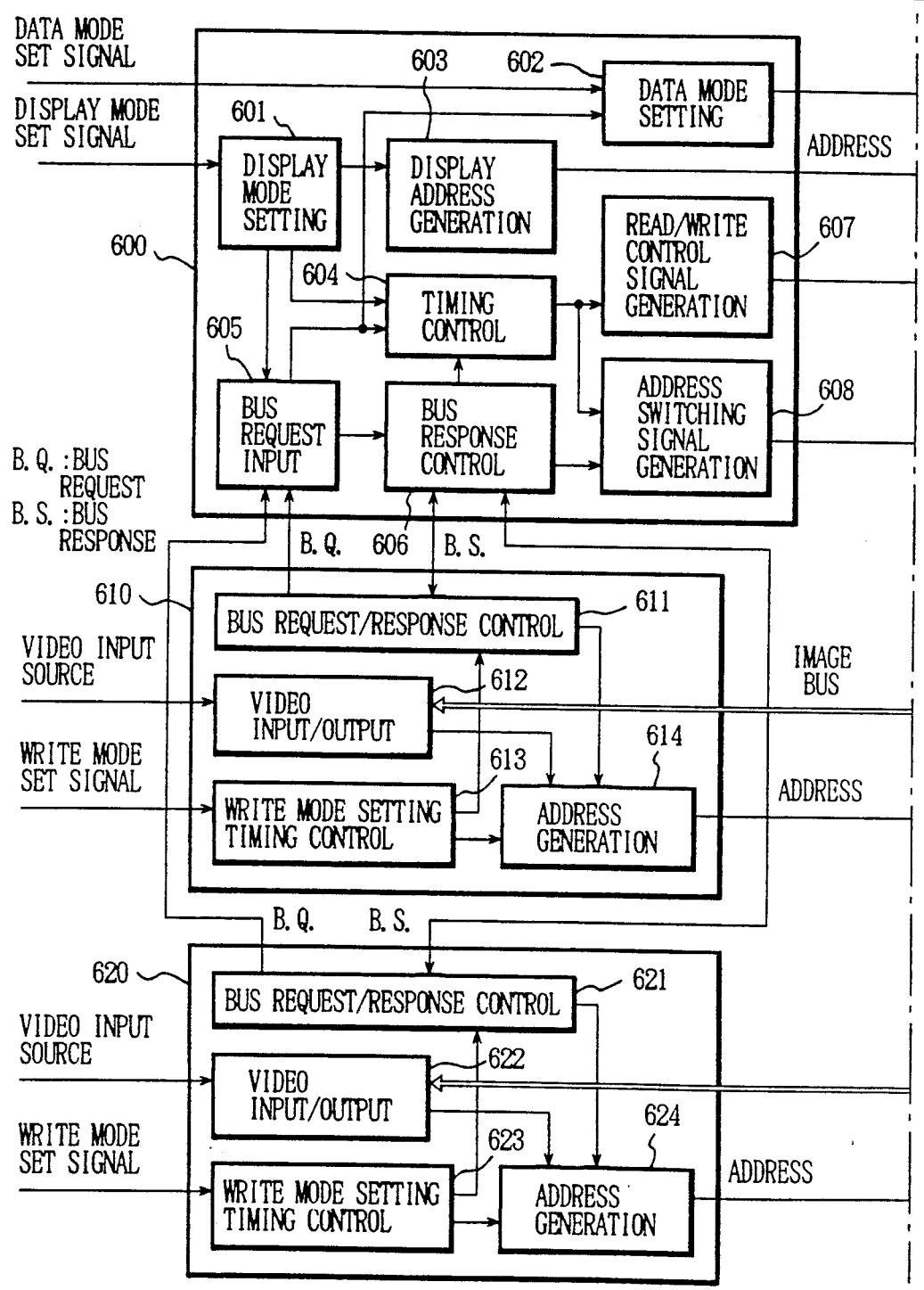

VIDEO SIGNAL SYNTHESIZING SYSTEM FOR SYNTHESIZING SYSTEM'S OWN SIGNAL AND EXTERNAL SIGNAL

BACKGROUND OF THE INVENTION

1. Field of the Invention

The present invention relates to a video signal synthesizing system, and more particularly to a video signal synthesizing system for synthesizing the system's own video signal such as an analog video signal, digital image data, encoded, compressed image data and so on and external signals such as character signals from other image processors.

2. Description of the Related Art

As inexpensive high-speed circuits such as ISDNs are popularized and as semiconductor technology and image compression technology improve, multimedia transmission and display devices that can transmit images of picture level, characters, and graphics are realized. In these multimedia transmission and display devices, synthesizing images from different image devices such as character devices and graphic devices can present various kinds of screen services to greatly expand the functions of image processors.

The system for synthesizing the system's inner video signal or signals and video signals from external video signal generating devices usually comprises an analog-to-digital (A/D) converter and a memory for an inner video signal, an A/D converter and a memory for an external video signal, a memory for synthesizing the inner and external video signals, a digital-to-analog (D/A) converter, a display, and so on. In this system, an analog video signal generated from a system's own apparatus (the inner video signal) is once converted into a digital signal by the A/D converter and stored in the memory, and an analog video signal from an external apparatus (the external video signal) is also converted into a digital signal by the A/D converter and stored in the memory respectively.

The digital video signals stored in the memories are synthesized by the synthesizing memory and converted again into an analog signal by the D/A converter. The synthesized video signal is displayed on the display.

In this way, the external video signal from the external video devices and at least one internal video signal are converted into digital signals and stored in the two video memories respectively, and then synthesized in a digital area. Accordingly, this system requires memories for each signal and a synthesizing memory, thereby increasing the cost.

In addition, it is obvious that digitizing the analog video signals and then converting the digital signal into an analog signal again may cause quantization distortion and thereby reduce accuracy.

SUMMARY OF THE INVENTION

The object of the present invention is to provide a video signal synthesizing system that can synthesize video signals from the system's own device and from an external image processor as they are in analog form and decrease the number of memories thereby minimizing quantization distortion.

According to one aspect of the present invention, an external video signal from the external image processor such as a personal computer is transferred to the video signal level changing portion, which changes the dynamic range of the signal to be equal to the dynamic range of the inner video signal generated by the system's own apparatus. If the brightness of the external video signal is too bright or dim, the brightness is balanced with respect to that of the inner video signal.

The synchronous signal transferred from the external image processor is provided to the PLL portion, which synchronizes the synchronous signal of the inner video signal with the externally transmitted synchronous signal. After the synchronous signals are equalized, the inner video signal is digitized and stored in the memory. Then, the inner video signal provided by the memory is converted into an analog signal, and added to the external video signal transmitted from the external image processor in accordance with the synchronous signal. Added video signals are amplified and displayed on the display.

According to another aspect of the present invention, a plurality of analog inner video signals are digitized and added before the addition of the external analog video signal, and stored in the memory. Then the added inner video signal provided by the memory is converted into an analog signal and added to the external video signal in accordance with the synchronous signal. Added video signals are amplified and displayed on the display.

In this way, the invention realizes an addition of an analog video signal from the system's own device and an analog video signal from an external image processor thereby decreasing the number of memories and minimizing quantization distortion.

BRIEF DESCRIPTION OF THE DRAWINGS

The present invention will be more clearly understood from the description as set forth below with reference to the accompanying drawings, wherein:

FIG. 7A and 7B are a detailed block circuit diagram showing an essential part of the video signal synthesizing system in FIG. 6.

DESCRIPTION OF THE PREFERRED EMBODIMENTS

Before describing the preferred embodiments, an explanation will be given of the conventional video signal synthesizing system shown in FIGS. 1 and 2.

Figure 1:
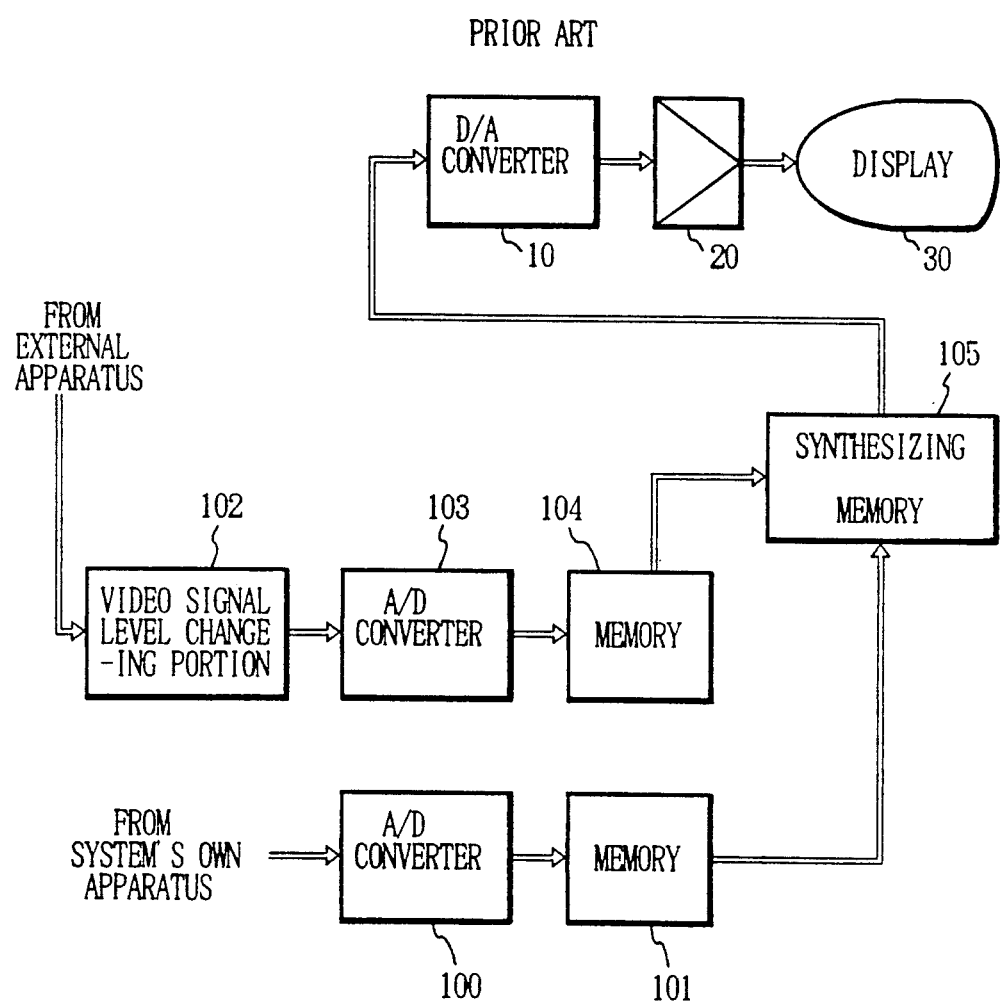
FIG. 1 is a prior art block circuit diagram of a basic video signal synthesizing system.

FIG. 1 shows a conventional video signal synthesizing system for synthesizing video signals from the system's own apparatus and from external video input apparatus. The system comprises analog-to-digital (A/D) converters 100 and 103, memories 101 and 104, a video signal level changing portion 102, a synthesizing memory 105, a digital-to-analog (D/A) converter 10, a display driver 20, a display 30, etc. An internal analog video signal from a system's own apparatus is converted into a digital signal by the A/D converter 100 and stored in the memory 101. An external analog video signal from an external apparatus is converted into a digital signal by the A/D converter 103 after the adjustment of the signal level by the video signal level changing portion 102 and stored in the memory 103.

The digital video signals stored in the memories 101 and 104 are synthesized by the synthesizing memory 105 and converted again into an analog signal by the D/A converter 10. The synthesized video signal is displayed on the display 30.

The conventional video signal synthesizing system having the above-mentioned arrangements have the following problems:

(1) The internal and external video signals are stored in the built-in video memories 101 and 104 and synthesized in a digital area thereby requiring a synthesizing memory 105 and increasing the cost; and (2) It is obvious that double conversion of the analog video signals from analog to digital and digital to analog may cause quantization distortion and thereby reduce accuracy.

Figure 2:
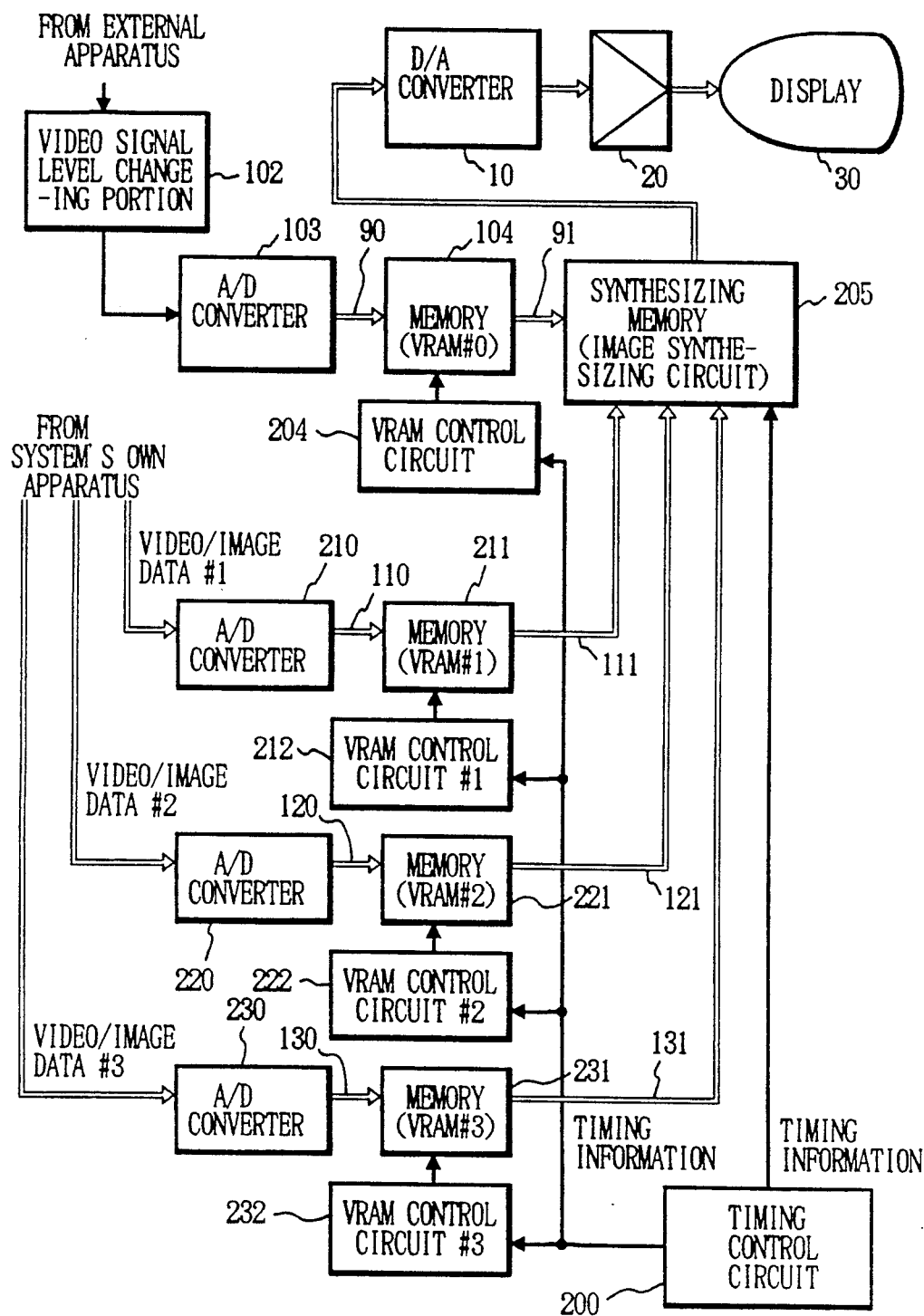
FIG. 2 is a prior art block circuit diagram of a video signal synthesizing system having a plurality of inner video sources to be synthesized other than an external video source.

FIG. 2 shows another conventional video signal synthesizing system for synthesizing three inner video signals from a system's own device and external video signals from an external video input apparatus. In FIG. 2, the components used in FIG. 1 are assigned the same reference numerals. The system comprises A/D converters 103, 210, 220, and 230, memories (VRAM : Video Random Access Memory) 104, 211, 221, and 231, VRAM control circuits 204, 212, 222, and 232, a video signal level changing portion 102, a synthesizing memory 205, a D/A converter 10, a display driver 20, a display 30, timing control circuit 200, etc.

Three kinds of internal analog video signals (video-/image data #1-#3) from a system's own apparatus are converted into digital signals by the A/D converters 210, 220, and 230 and stored in the memories 211, 221, and 231 with the control of VRAM control circuits 212, 222, and 232. An external analog video signal from an external apparatus is converted into a digital signal by the A/D converter 103 after the adjustment of the signal level by the video signal level changing portion 102 and stored in the memory 104 with the control of VRAM control circuits 204.

The digital video signals stored in the memories 104, 211, 221, and 231 are synthesized by the synthesizing memory 205 and converted again into an analog signal by the D/A converter 10. The synthesized video signal is displayed on the display 30. The VRAM control circuits 204, 212, 222, and 232 and the synthesizing memory 205 is operated by the timing information transmitted from the timing control circuit 200. The operation of the video signal synthesizing system of FIG. 2 will be explained hereinafter in detail.

The memories 211, 221, and 231 used for the system in FIG. 2 are required to have a high-speed read/write function to follow a display speed, a function of equally handling a plurality of image data input sources, and a function of expressing image data with picture-level colors (for example, eight bits each for R, G, and B for presenting 16.7 million colors).

To achieve this, a conventional system shown in FIG. 2 employs three memories (VRAMs) 211, 221, and 231 for each video/image data #1-#3 from a system's own apparatus respectively, and an image synthesizing circuit 205 for synthesizing video signals provided by the memories 211, 221, and 231.

For example, the video/image data #1 is a signal from a video camera, the video/image data #2 is a signal from a character input unit, the video/image data #3 is a signal from a graphic input unit, and the external signal is a signal from another character generating device. Digital video signals from the A/D converters 103, 210, 220, and 230 are passed through write buses 90, 110, 120, and 130, and temporarily stored in the VRAMs 104, 210, 220, and 230, respectively. The VRAM control circuits 204, 212, 222, and 232 provide read/write control signals for controlling read/write operations.

Signals read out of the VRAMs 104, 211, 221, and 231 are passed through display buses 91, 111, 121, and 131, and synthesized in the image synthesizing circuit (synthesizing memory) 205. At this time, a timing control circuit 200 provides the VRAM control circuits 204, 212, 222, and 232 and the image synthesizing circuit 205 with VRAM read timing information and synthesis timing information.

The synthesized image from the image synthesizing circuit 205 is converted into an analog signal by a D/A converter 10 and displayed on a display 30 driven by the driver 20.

In this sort of distributed control type video signal synthesizing system shown in FIG. 2, each of the lines for the video/image data #1-#3 has a VRAM, bus, and VRAM control circuit, and data is read out of the respective VRAMs. Namely, this system requires a plurality of large scale VRAMs. In addition, the system requires a plurality of image buses each having a wide width (in the example of FIG. 2, each bus comprises 24 lines) to complicate circuit patterns. To read and synthesize a plurality of data from the VRAMs and produce a single display plane according to the synthesized data, read timing of the VRAMs must be completely equalized. This sort of timing control is difficult. For example, a timing control circuit must be provided to control the timing of all of the VRAM control circuits.

Use of the conventional system increases the circuit scale, complicates the circuit arrangement, and therefore, is unsuitable for small desktop size apparatuses.

Figure 3:
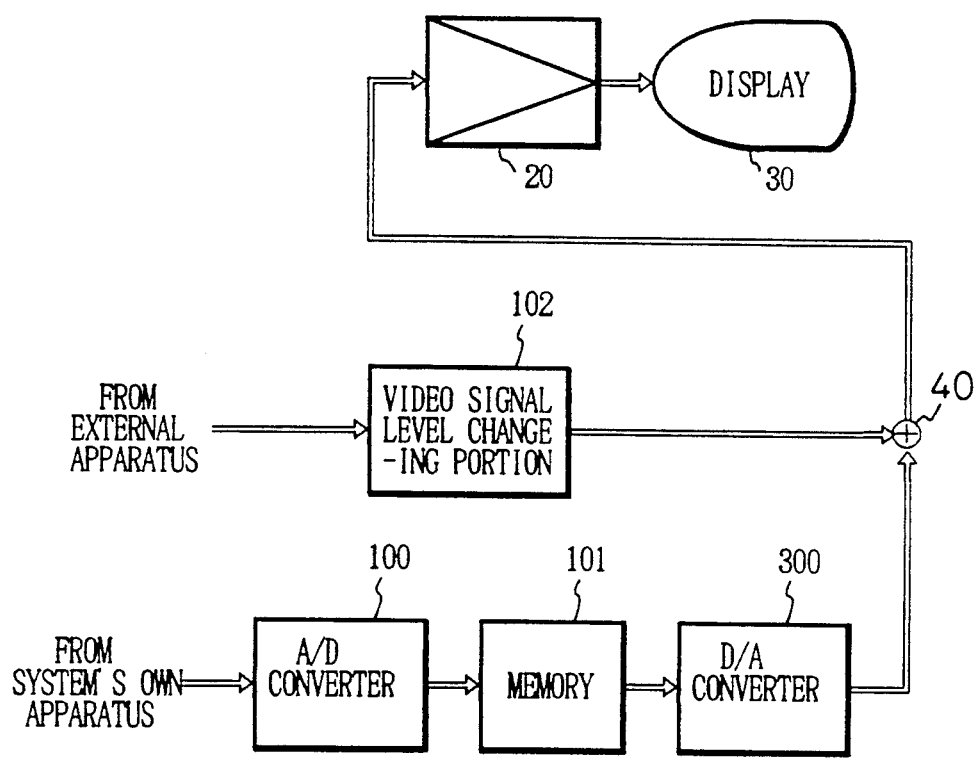
FIG. 3 is a basic block circuit diagram of a video signal synthesizing system according to one embodiment of the present invention.
Figure 4:
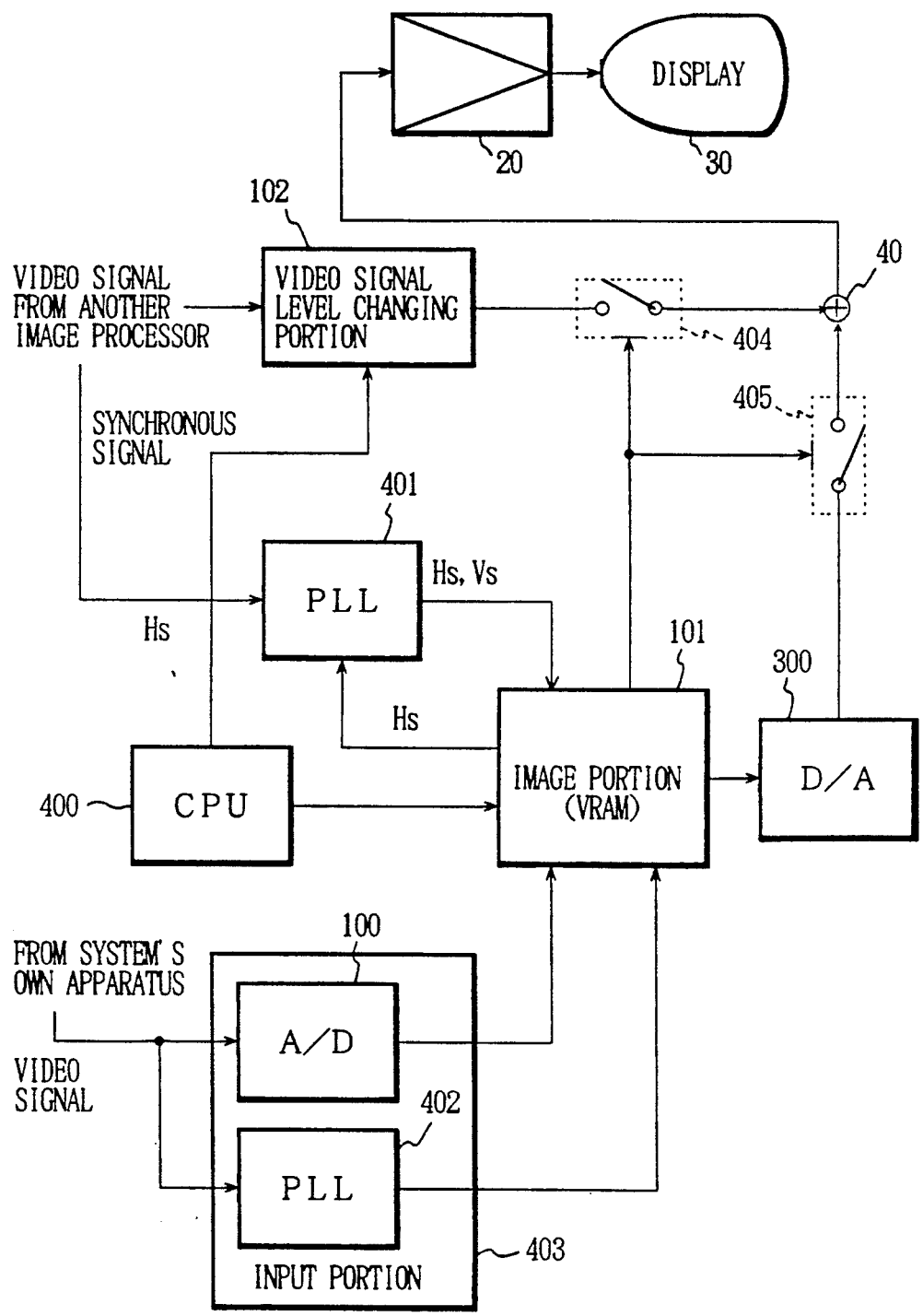
FIG. 4 is a detailed block circuit diagram of the video signal synthesizing system in FIG. 3.
Figure 5:
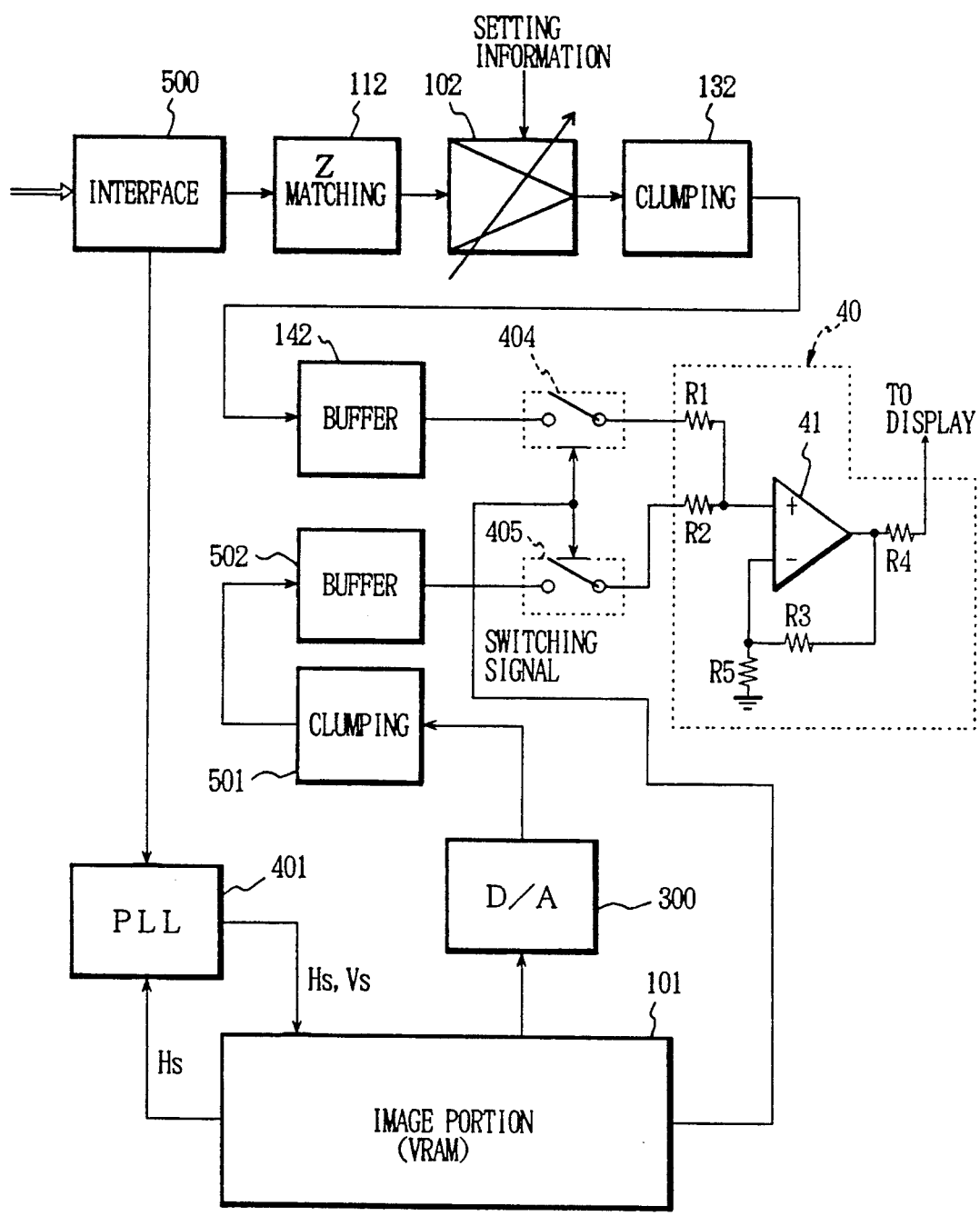
FIG. 5 is a detailed block circuit diagram showing an essential part of the video signal synthesizing system in FIG. 4.

A first embodiment of the present invention will be explained with reference to FIGS. 3, 4, and 5. In FIGS. 3, 4, and 5, similar components as used in FIG. 1 are assigned the same reference numerals.

FIG. 3 shows a basic block circuit diagram of a video signal synthesizing system according to a first embodiment of the present invention. The system comprises an A/D converter 100, memory 101, a video signal level changing portion 102, D/A converter 300, an analog and video signals adding amplifier 40, a display driver 20, a display 30, etc. An internal analog video signal from a system's own apparatus is once converted into a digital signal by the A/D converter 100 and stored in the memory 101. The digital video signals stored in the memory 101 are input to the analog and video signals adding amplifier 40.

An external analog video signal from an external apparatus is adjusted to the signal level by the video signal level changing portion 102 and then input to the analog and video signals adding amplifier 40 without being converted into a digital signal.

The analog video signals input to the analog and video signals adding amplifier 40 are synthesized hereby and the synthesized video signal is displayed on the display 30 through the driver 20.

In comparing the video signal synthesizing system in FIG. 3 with the conventional video signal synthesizing system in FIG. 1, it is clearly understood that the construction of the video signal synthesizing system according to the present invention is simple, because there is no A/D converter and memory for the external video signal and synthesizing memory.

FIG. 4 is a block diagram showing the construction of the first embodiment of the present invention, and FIG. 5 a detailed view showing an essential part of the embodiment.

To achieve the previously described object, the present invention shown in FIG. 4 arranges an input portion 403, a CPU 400, an image portion (VRAM) 101, a D/A converter 300, a video signal level changing portion 102, analog switches 404 and 405, an analog video signals adding amplifier 40, a driver 20, a PLL (Phase Locked Loop) portion 401, display 30, etc. The input portion 403 comprises an A/D converter 100, a PLL portion 402, etc.

The input portion 403 receives an internal video signal transmitted from a system's own video apparatus such as a television camera. The signal is converted into a digital signal by the A/D converter 100. A synchronous signal contained in the received video signal is transferred to the PLL portion 402, which provides the image portion 101 with the synchronous signal (for horizontal and vertical synchronization). A frame memory in the image portion 101 stores the video signal from the system's own apparatus.

An external video signal from an external image processor such as a personal computer is provided to the image signal level changing portion 102, and a synchronous signal contained in the video signal is supplied to the PLL portion 401.

The video signal level changing portion 102 adjusts the dynamic range of the video signal from the external image processor to be equal to the dynamic range of the image signal from the system's own apparatus. If the input image signal is too bright or dim, the image signal level changing portion adjusts the same to the brightness of the image signal from the system's own apparatus.

The PLL portion 401 adjusts the system's own synchronous signal to the synchronous signal from the external image processor.

The operation of the video signal synthesizing system of FIG. 4 will be explained hereinafter in detail.

In FIG. 4, numeral 403 denotes an input portion for receiving a video signal and a synchronous signal from a system's own video apparatus such as a television camera. The video signal is converted into a digital signal by an A/D converter 100, and the synchronous signal is provided to a PLL portion 402. According to the synchronous signal, an image portion 101 carries out a control operation.

Numeral 400 denotes a CPU, which wholly controls the image processing system.

Numeral 101 denotes the image portion, which provides switching control signals to analog switches 404 and 405 according to instructions from the CPU 400. The image portion has a memory for storing the video signal from the system's own video apparatus.

Numeral 102 denotes a video signal level changing portion, which equalizes the reference levels of analog signals to be added. If the video signal from the system's own video apparatus has intensity levels from 0 to 255 like a natural image, and if the video signal from the external image processor such as a personal computer has intensity levels from 0 to 15, these video signals will not be correctly added to each other with a simple analog adding operation. An intermediate level 128 of the 256 intensity levels and an intermediate level 8 of the 16 intensity levels must be adjusted to each other, and upper and lower intensities around the intermediate levels must be balanced. This adjustment may be done according to intensity levels derived from the input signals. When the input signal from the external image processor is too bright or dim, it may be adjusted by changing to a proper intensity level.

Numerals 404 and 405 denote analog switches, respectively. According to switching signals provided by the image portion 101, the analog switch 404 alone, or the analog switch 405 alone, or both of them may be turned ON or OFF. When synthesizing and displaying the video signal from the system's own apparatus and the video signal from the external image processor, both the analog switches 404 and 405 are turned ON. When one of the signals is to be displayed, one of the analog switches 404 and 405 corresponding to the signal to be displayed is turned ON.

The analog video signals adding amplifier 40 for adding the analog signals transmitted through the analog switches 404 and 405 to each other comprises a broadband operational amplifier 41 and resistors R1 to R5, as shown in FIG. 5. The operational amplifier 41 is used with, for example, a non-inverting input, and independently perform adding, amplifying, and driving functions.

Numeral 401 denotes a PLL portion, which compares the phase of a synchronous signal (a horizontal synchronous signal) to be transmitted with the video signal provided by the external image processor with the phase of a horizontal synchronous signal from the system's own image processor, and synchronizes these signals with each other. In this way, this arrangement synchronizes both signals with each other.

As shown in FIG. 5, the input video signal from the external image processor is actually provided to an interface 500, and the video signal is subjected to an impedance matching process in a Z matching portion 112 and provided to the video signal level changing portion 102, which adjusts the level of the video signal.

At this moment, the level is set according to information related to the external image processor. For example, if the signal from the external image processor is classified into four levels, the CPU 400 provides, automatically according to the video signal level setting information or based on a keyboard input, a 2-bit control signal to properly set the level.

The level-adjusted video signal is clamped by a clamping portion 132 and transferred to the analog switch 404 through a buffer 142. On the other hand, a video signal from the image portion 101 is converted into an analog signal by the D/A converter 300, clamped by a clamping portion 501, and transferred to the analog switch 405 through a buffer 502. These signals are synthesized in the analog video signal adding amplifier 40, and the synthesized signal is displayed on the display 30 through the driver 20.

In this way, the present invention does not simply add analog signals to each other but changes the level of the external video signal provided by the external image processor and adds it to another analog inner video signal. The video signal synthesizing system according to the present invention is very useful when the inner video signal is a motion picture image and the external video signal is a character image or vice versa.

Due to the switches 404 and 405, the invention can display not only a synthesized image but also images provided by the external image processor and the system's own image portion independently of each other.

The PLL portion may be modified according to a display frequency of the external image processor. This enables the system to easily accept other kinds of external apparatus.

The above-described embodiment can synthesize external analog signals without converting them into digital signals, so that circuits for converting the signals are not needed, and quantization errors are eliminated. In addition, various kinds of video signals from external image processors can be synthesized with the internal video signals by applying the above-described embodiment.

Figure 6:
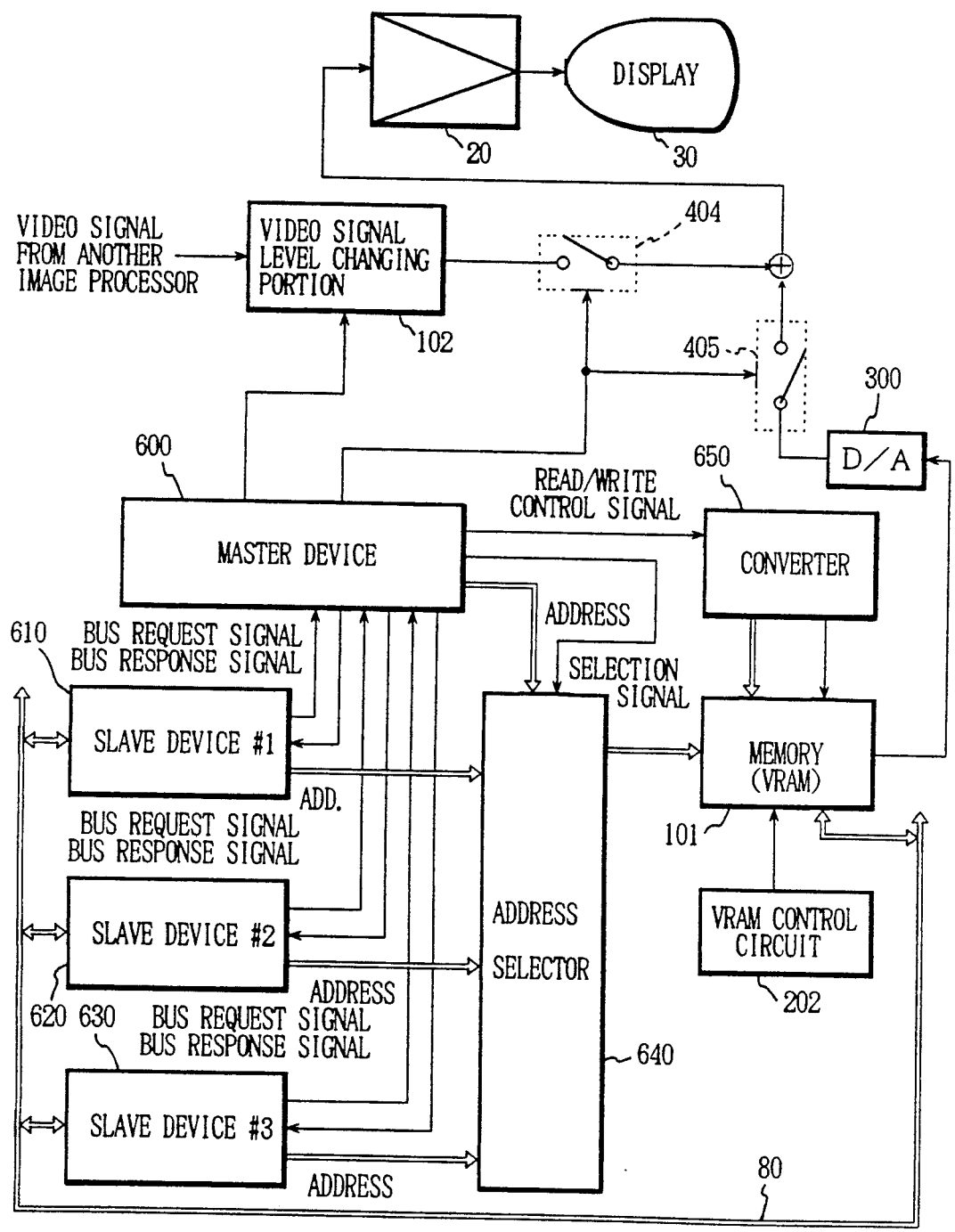
FIG. 6 is a basic block circuit diagram of a video signal synthesizing system according to another embodiment of the present invention.

A second embodiment of the present invention will be explained with reference to FIGS. 6 and 7. In FIGS. 6 and 5, similar components as used in FIG. 2 are assigned the same reference numerals.

Figure 7B:
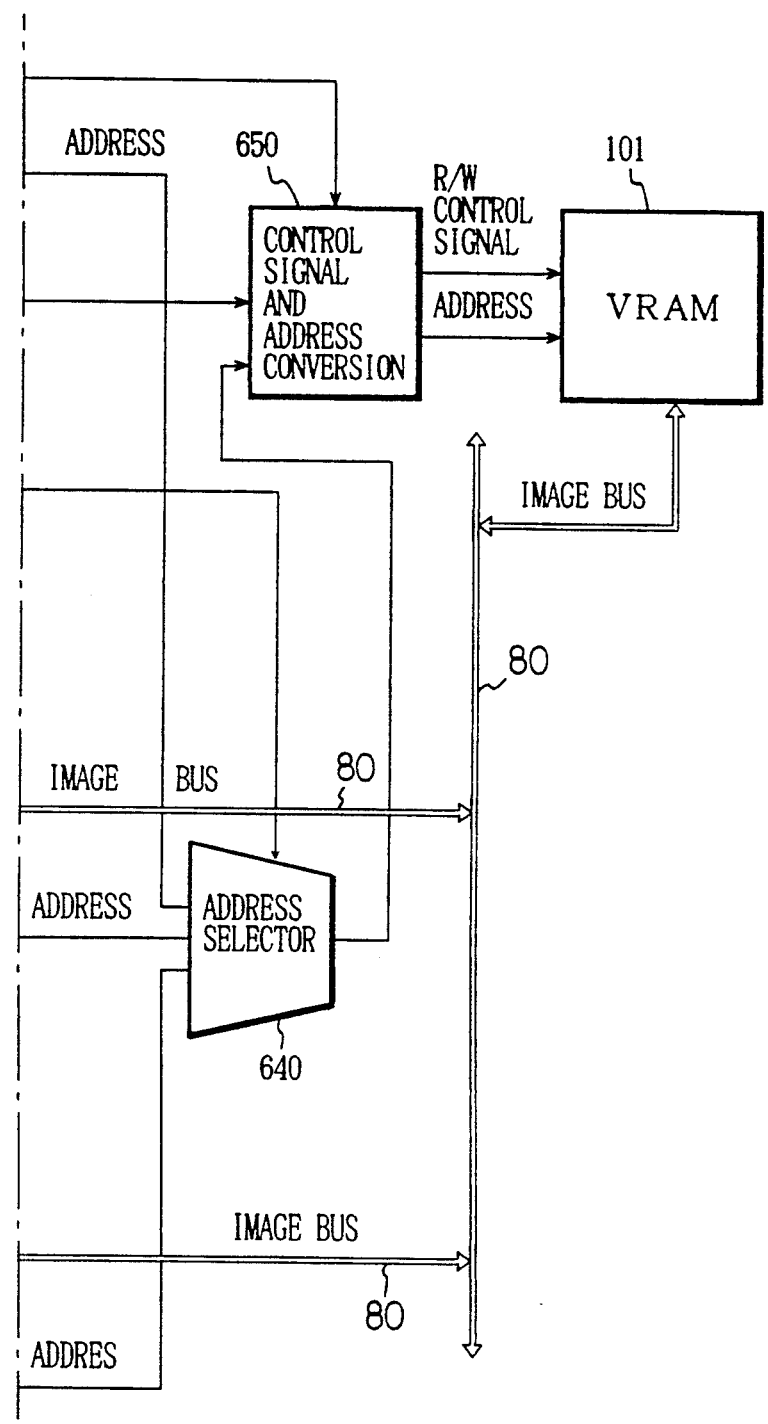

FIG. 6 is a block diagram showing the construction of the second embodiment of the present invention, and FIG. 7 a detailed view showing an essential part of the embodiment. In the second embodiment, the video signal synthesizing system has a plurality of inner video signal sources, such as three inner video signals from the system's own device, and synthesizes them with one external video signal from an external video input apparatus.

To achieve the previously described object in the second embodiment, a VRAM controlling system that can materialize a compact multimedia image communication terminal with a simple arrangement of a VRAM, an image bus, and a VRAM control circuit, which has to be arranged for each usage (for each input/output interface) according to the prior art, and without spoiling necessary functions, is required.

Unlike the prior art that arranges VRAMs, image buses, and VRAM control circuits for video and image input sources respectively, and permits the video and image input sources separate access to the VRAMs, the invention considers the following points in achieving its object:

(1) When actually displaying data, an image data from only one VRAM is needed, and at a certain moment only one VRAM is accessed;

(2) VRAMs are accessed for displaying images therefrom or for writing images therein. During the display access, all VRAMs must be ready (even if any one of the VRAMs is unselected as a display plane, this VRAM alone cannot be put in a write mode); and (3) The display access must be continuously carried out in time series. The access frequency under a write mode is small (discrete) compared with that under a display mode.

The invention arranges, as shown in FIG. 6, an image portion (VRAM) 101, a video signal level changing portion 102, a VRAM control circuit 202, a D/A converter 300, analog switches 404 and 405, an analog video signals adding amplifier 40, a driver 20, display 30 such as a CRT monitor, a master device 600, slave devices 610, 620, and 630, an address selector 640, and a converter 650. The master device 600 serves as a master controller for collectively managing the control right of the VRAM 101. The master device 600 controls other video and image input sources, i.e., slave devices 610, 620, and 630. Under the control of the master device 600, the slave devices 610, 620, and 630 share a single VRAM 101. Namely, the invention can constitute a system with the VRAM 101, an image bus 80, and a VRAM control circuit 202. Compared with the distributed control system of FIG. 2, the invention realizes a centralized control system.

The address selector 640 selects a slave device 610, 620, or 630 that has issued a bus request or the master device 600 according to a selection signal provided by the master device 600, and provides an address.

The VRAM 101 may be formed in two layers (two pixels being read each time in horizontal scanning) or four layers (four pixels being read each time in horizontal scanning) depending on a display purpose. The converter 650 carries out an address output conversion and a read/write control signal output conversion according to the two or four layers.

In FIG. 6, the master device 600 has a read/write control right of the VRAM 101, and the slave devices 610 to 630 are controlled by the master device 600 when accessing the VRAM 101.

During the display mode, the master device 600 gives no reply to any one of the slave devices 610 to 630 that have issued a bus request signal, and continues a display operation according to VRAM read signals and addresses produced by the master device 600. Namely, the master device 600 exclusively uses the image bus 80.

During the write mode, the master device 600 provides a reply to any one of the slave devices 610, 620, or 630 that have issued a bus request signal and allocates a right to use the bus 80 to the slave device 610, 620, or 630. The slave device 610, 620, or 630 that has received the reply sends information, such as a write address and write data peculiar to the slave device, to the address selector 640 and bus 80.

The master device 600 provides the address selector 640 with a common signal such as a read/write signal related to the VRAM 101 and a selection signal corresponding to the slave device 610, 620, or 630 to which the right to use the bus 80 has been given. The VRAM 101 is then accessed according to the address provided by the slave device 610, 620, or 630. At this moment, the VRAM 101 operates as an exclusive memory for the slave device having the bus using right.

Image data may be supplied in different formats such as two- and four-layer formats depending on images handled by the respective video and image input sources.

Owing to the converter 650, even a single-pattern VRAM can deal with a plurality of data formats.

In this way, according to the present invention, the master device 600 accesses the single VRAM 101 during the display mode, and during the write mode, it controls a slave device 610, 620, or 630 that has issued an access request. Namely, the VRAM 101 is always in operation. Thus, the invention reduces idle devices and effectively uses devices. Since input images from a plurality of the video and image input sources can be digitally synthesized on the VRAM 101, the images may be easily positioned with complex overlapping.

The operation of the second embodiment of the present invention will be explained in detail with reference to FIG. 7 indicating the essential part of FIG. 6. The arrangement of FIG. 7 involves a VRAM 101, a master device 600, slave devices 610 and 620, an address selector 640, and a converter 650. The other components such as D/A converter 300 and a display 30 are omitted.

A master device 600 manages an overall operation of a display mode, controls the priority (first-take priority) of bus requests from the slave devices 610 and 620, and generates a bus response signal for providing a right to use a bus. The master device 600 comprises a display mode setting portion 601, a data mode setting portion 602, a display address generator 603, a timing controller 604, a bus request input portion 605, a bus response controller 606, a read/write control signal generator 607, and address switching signal generator 608, etc.

The display mode setting portion 601 receives data for setting the display mode. For example, it receives and sets horizontal and vertical frequencies, a display area, etc. These data are provided through a keyboard (not shown) and set by a CPU (not shown).

The data mode setting portion 602 sets a VRAM access format for the display mode or a write mode. For example, data for two or four layers is set. This data is provided through the keyboard (not shown) and set by the CPU (not shown).

The display address generator 603 generates a display address according to the display mode setting data.

The timing controller 604 controls timing according to the display mode setting data, etc.

The bus request input portion 605 carries out priority control upon receiving a bus request from any one of the slave devices. For example, it carries out first-take priority control or real-time priority control. During the display mode, it controls the bus response controller 606 such that no response is provided to a bus request.

The bus response controller 606 responds to a bus request from a slave device under the control of the bus request input portion 605.

The read/write control signal generator 607 generates a read/write control signal.

The address switching signal generator 608 provides a control signal for selecting an address provided from the address selector 640. According to the control signal, one of the addresses provided by the master device 600 or slave devices 610 or 620 are selected.

The slave devices 610 and 620 share the image writing function in the VRAM 101. Any one of the slave devices 610 or 620 may send a bus request signal to the master device 600 when writing is required and provide a write address and write data to the VRAM 101 upon receiving a bus response signal from the master device 600. The slave device 610 comprises a bus request/response controller 611, a video input/output portion 612, a write mode setting timing controller 613, an address generator 614, etc.

The bus request/response controller 611 sends a bus request to the master device 600 and receives a bus response from the master device 600.

The video input/output portion 612 is connected to a video input source such as a video camera, character input device, and graphic input device, and generates image data.

The write mode setting timing controller 613 is set with write mode setting data such as a write address. The setting data is provided through the keyboard (not shown) and set by the CPU (not shown).

The address generator 614 generates an address according to the write mode setting data and provides the address to the address selector 640.

The slave device 620 has the same arrangement as the slave device 610 and operates in the same manner. The slave device 620 comprises a bus request/response controller 621, a video input/output portion 622, a write mode setting timing controller 623, an address generator 624, etc.

An operation of the present invention will be explained for (1) the display mode and (2) the write mode.

(1) Operation in the display mode

During the display mode, the master device 600 sequentially reads image data out of specified areas of the VRAM 101. The read data are converted into analog signals by the D/A converter 300 and displayed on the display 30 such as a CRT monitor when the analog switch 405 is turned ON. When the analog switch 404 is also turned ON, analog image data from the D/A converter 300 is synthesized with the external analog data from the video signal level changing portion 102 as explained in the first embodiment.

In the master device 600, the display address generator 603 provides a display address according to horizontal and vertical frequencies and an image display area preset in the display mode setting portion 601, while the read/write control signal generator 607 provides a read/write control signal.

At this time, the address switching signal generator 608 provides a selection signal for letting the address selector 640 output the address provided by the master device 600.

The address provided by the master device 600 through the address selector 640 and the read/write control signal provided by the read/write control signal generator 607 are converted by the control signal and address converter 650 into a display mode VRAM accessing format that is preset in the data mode setting portion 602 of the master device 600. The format is provided to the VRAM 101, which is then read.

While the VRAM 101 is being accessed under the display mode, bus requests from the slave devices 610 and 620 to the bus request input portion 605 are not answered at once. When writing is possible, the bus response controller 606 provides a bus response.

(2) Operation in the write mode

The writing is carried out when the display mode is OFF, or during an access gap of the VRAM 101 under the display mode. Whether or not the writing is possible is determined according to a display mode setting information set in the master device 600. This information is centrally controlled by the master device 600.

If the slave device 610 intends to write data in the VRAM 101 according to a write mode setting information set in the write mode setting timing controller 613, the bus request/response controller 611 provides a bus request signal to the master device 600.

This bus request signal can be provided at any time irrespective of whether or not the write operation is possible.

When the bus request input portion 605 of the master device 600 receives the bus request signal from the slave device 610, the bus response controller 606 provides a bus response signal to the slave device that has provided the bus request, in the next write enabled cycle. At the same time, the master device 600 provides an address select signal to the address selector 640 so that the address from the slave device 610 may be output. Also, the data mode controller 602 provides the control signal and address converter 650 with a data mode setting signal corresponding to the slave device 610 that issued the request.

When the bus request/response controller 611 of the slave device 610 receives the bus response signal, the video input/output portion 612 provides image data, and the address generator 614 provides an address for accessing the VRAM 101. At this time, a read/write control signal for accessing the VRAM is provided by the read/write control signal generator 607 of the master device 600.

The address provided by the slave device 610 through the address selector 640 is converted by the control signal and address converter 650 according to the arrangement of the VRAM 101 and according to the data mode setting signal transmitted from the data mode setting portion 602 of the master device 600. In this way, the VRAM is indirectly accessed.

As mentioned above, the present invention allows the slave devices 610, 620, or 630 to access the VRAM 101 in a free data format only by controlling requests and responses to and from the master device 600, without considering the arrangement of the VRAM 101.

Naturally, a plurality of the slave devices can access the VRAM 101 in a time sharing manner. The number of the slave devices may be four or more.

During the write mode operation, writing animated images requires a high speed real-time capacity, and writing the results of processed images requires a relatively slow speed capacity because it involves other time-taking processes. These are dependent on the characteristics of the slave devices.

Generally, when a single VRAM is accessed by a plurality of access sources in a time sharing manner as in the case of this embodiment, all of the access sources must be equally treated. This may sacrifice the real-time capacity. According to the present invention, however, the master device allocates priority of the slave devices in a way to first process the slave device that requires the real-time capacity if bus requests are simultaneously presented from a plurality of the slave devices, thereby securing the real-time capacity.

According to a prior art, an image synthesizing apparatus is formed by combining a plurality of image input/output functions such as video cameras, video tape recorders, character input means, and graphic input means, so that it may involve redundancy.

The present invention collectively grasps a plurality of video and image input/output functions of image portions (VRAM peripheral circuits and display systems) of, for example, a multimedia image communication terminal as one collective function of the terminal. The invention properly distributes the function and employs commonly used circuits, thereby suppressing circuit redundancy as low as possible and minimizing the size without reducing necessary functions.

As explained above, the present invention arranges a master device for collectively controlling a VRAM and a plurality of slave devices (video or image input sources). With a single VRAM, a single system of image bus, and a VRAM control circuit, the present invention forms a VRAM circuit for a multimedia image terminal having synthesizing and display functions, without impairing or reducing the functions of the VRAM circuit.

Since a circuit for converting read/write control signals and addresses is provided, video and image input sources can be arranged without regard to the arrangement of the VRAM. This means that the arrangement of the VRAM is free to adapt itself to high-speed display purposes without regard to the number of layers, horizontal resolution, and image elements.

In this way, the present invention can simplify and minimize the VRAM circuit in the video signal synthesizing system for synthesizing a plurality of inner video signals from a system's own device and external video signal from an external video input apparatus to form a compact and flexible multimedia image terminal.

We claim:

1. A video signal synthesizing system for synthesizing at least one analog video signal from a system's own apparatus and an analog video signal from another external apparatus in analog form, comprising:

first converting means for converting all the inner analog video signals from the system's own apparatus into inner digital video signals:

means for detecting a synchronous signal from the converted digital video signals;

first synthesizing means for synthesizing the inner digital video signals in digital form when a plurality of the inner video signals exist;

means for temporarily storing the converted digital video signals;

means for adjusting the level of an external analog video signal from the external apparatus to be equal to the level of an inner analog video signal of the system's own apparatus;

means for synchronizing synchronous signals of the external analog video signal and the inner video signal;

means for reading out a digital video signal from the storing means in accordance with a synchronized synchronous signal from said synchronizing means;

second converting means for converting the digital video signal read out from the storing means into an analog video signal;

second synthesizing means for synthesizing the converted analog video signal of the system's own apparatus and the analog video signal from the external apparatus in analog form;

means for displaying the synthesized analog video signal;

a first switching means for switching the analog video signal from the external apparatus; and a second switching means for switching the analog video signal from the system's own apparatus.

2. A video signal synthesizing system as set forth in claim 1, wherein:

said first switching means is provided in the line connecting the level adjusting means and the second synthesizing means; and said second switching means is provided in the line connecting the second converting means and the second synthesizing means.

3. A video signal synthesizing system as set forth in claim 2, further comprising means for turning ON the first and second switching means when one of the analog video signals from the system's own apparatus or the external apparatus is a motion picture signal and the other is a character signal.

4. A video signal synthesizing system as set forth in claim 2, further comprising a means for selectively turning ON the first and second switching means when both of the analog video signals from the system's own apparatus and the external apparatus are motion picture signals.

5. A video signal synthesizing system as set forth in claim 1, wherein the first synthesizing means for synthesizing the inner digital video signals in digital form when a plurality of the inner video signals exist comprises:
- a master device for controlling accessing priority to the VRAM;
- a plurality of slave devices for providing image data and addresses; and
- an address selector for selecting and providing an address,
- the master device providing a selection signal for letting the address selector select any one of the addresses transferred from the master device and slave devices.

6. A video signal synthesizing system as set forth in claim 5, wherein
said first switching means is provided in the line connecting the level adjusting means and the second synthesizing means; and
said second switching means is provided in the line connecting the second converting means and the second synthesizing means.

7. A video signal synthesizing system as set forth in claim 5, further comprising a converting means for converting a control signal transmitted from the master device and the address provided by the address selector in accordance with the structure of the storing means.

8. A video signal synthesizing system as set forth in claim 7, wherein
said first switching means is provided in the line connecting the level adjusting means and the second synthesizing means; and
said second switching means is provided in the line connecting the second converting means and the second synthesizing means.

* * * * *